June 10, 1924.
G. L. KELLEY
1,497,513
MACHINE FOR OPERATING ON FLOORS OR OTHER SURFACES
Filed Oct. 16, 1920
2 Sheets-Sheet 1
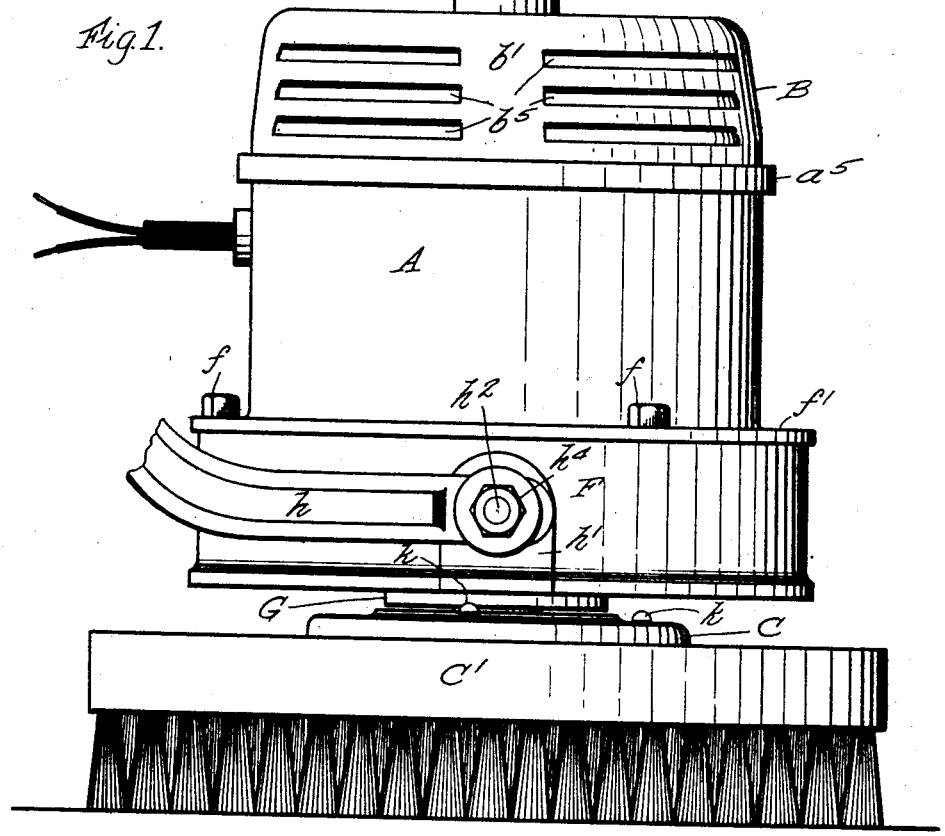
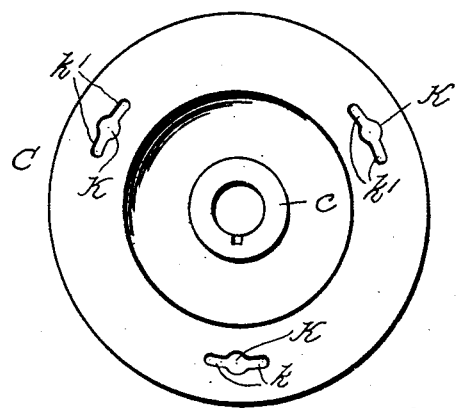
Inventor.
George L. Kelley
By Parker & Prochurd.
Attorneys.

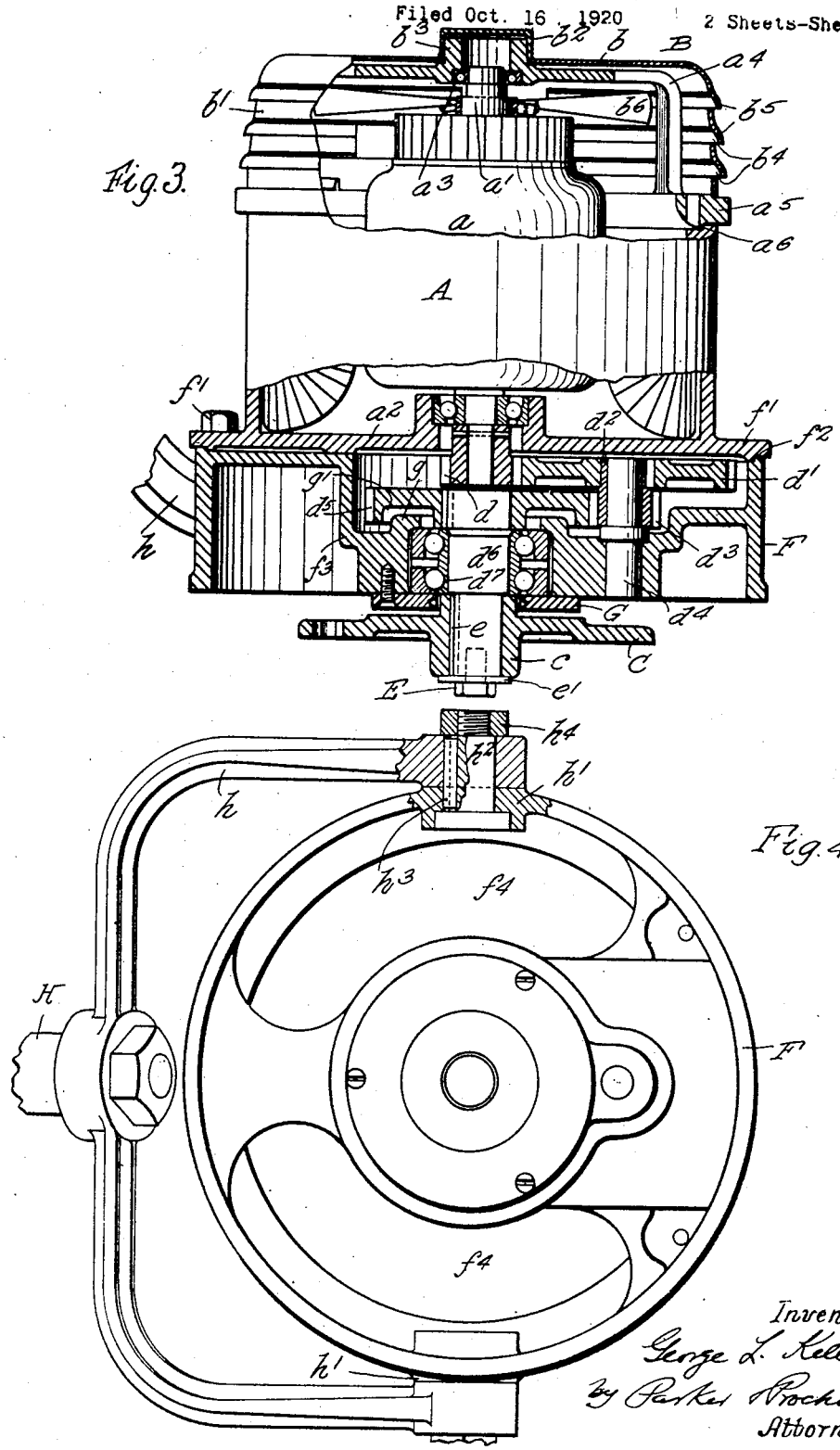

Patented June 10, 1924.

1,497,513

UNITED STATES PATENT OFFICE.

GEORGE L. KELLEY, OF BUFFALO, NEW YORK.

MACHINE FOR OPERATING ON FLOORS OR OTHER SURFACES.

Application filed October 16, 1920. Serial No. 417,426.

*To all whom it may concern:*

Be it known that I, GEORGE L. KELLEY, a citizen of the United States, residing at Buffalo, in the county of Erie and State of New York, have invented a new and useful Improvement in Machines for Operating on Floors or Other Surfaces, of which the following is a specification.

This invention relates to machines for grinding, cleaning, finishing and polishing floors or other substantially flat surfaces.

The objects of this invention are to provide a machine with means of improved construction for ventilating and cooling the driving motor of the machine; also to provide machines of this kind with a gear case of improved construction; also to so construct a machine of this kind as to make it possible to reverse the direction of rotation of the motor; also to improve the construction of machines of this kind in other respects hereinafter specified.

In the accompanying drawings:

Fig. 1 is a side elevation of a floor machine embodying the invention, a part of the controlling handle being broken away.

Fig. 2 is a bottom plan view of the attaching plate of the machine.

Fig. 3 is a side elevation of the machine, partly in section.

Fig. 4 is a bottom plan view thereof with the attaching plate omitted.

In the particular embodiment of the invention shown in the drawings, the machine is driven by a motor of any suitable kind, preferably a reversible electric motor, and which includes a casing or housing A and an armature $a$ having a shaft $a'$. The lower end of the motor housing is provided with a bridge member or portion $a^2$ in which is arranged a bearing for the lower portion of the armature shaft, and the upper end of this shaft is journalled in a bearing $a^3$ formed in a top bearing member or frame. This top bearing member is preferably of skeleton construction, having arms $a^4$, emanating from a central or hub portion and terminating in an outer ring $a^5$ which is secured on the upper edge of the motor housing or casing A. In order to ensure perfect alinement of the upper and lower bearings of the armature shafts, the outer ring of the upper bearing member is preferably provided with an annular shoulder $a^6$ which is adapted to cooperate with a corresponding shoulder formed on the motor housing A. These two shoulders can be accurately cut concentric with the bearing portions of the housing and bearing member. When the parts of the machine are assembled, the annular shoulders of the motor housing and top bearing member are placed into engagement, thus accurately alining the two bearings of the armature shaft. Any desired means for securing the top bearing member on the motor housing may be employed, and if desired, other means for centering the top bearing member on the motor housing may be employed.

In order to protect the machine against water, dirt and other foreign matter, and at the same time provide for a circulation of air to cool the motor, the following construction is preferably used:

The upper bearing member, which is of skeleton construction, is covered with a dome or cover B which may be of sheet metal or the like and which has an upper, flat or disk portion $b$ which has a downwardly extending, annular, side wall portion $b'$, the lower edge of which rests upon the ring $a^5$ of the top bearing member. This dome may be secured on the top bearing member of the motor in any suitable manner, for example by means of a screw cap $b^2$ having a threaded engagement with a central boss or projecting part $b^3$ of the top bearing member. The upper face of the dome or cover is imperforate, thus preventing any foreign matter from dropping or falling into the motor and the sides of the cover are provided with a plurality of ventilating openings $b^4$ which are so formed as to open downwardly. In the construction shown these openings are formed by slitting the side portions of the cover at intervals and bending the portion of the metal above the slit outwardly as shown at $b^5$, thus preventing foreign matter from entering the motor. In order to ensure a flow of air downwardly through the motor a fan $b^6$ of any usual or suitable construction is preferably arranged on the armature shaft which forces a current of air downwardly through the motor.

Power is transmitted from the motor through suitable gearing to an attachment holder or plate C to which any suitable brush, sanding or polishing head or other driven member or attachment may be secured, such for example as the brush C', shown in Fig. 1. This attachment holder may be of any desired construction, the holder shown consisting of a circular plate or disk having an integral hub $c$. The gearing connecting the motor and the attachment holder C may be of the usual type, including a pinion $d$ secured to the lower end of the armature shaft and meshing with a gear $d'$ rigidly secured on a sleeve or bushing $d^2$, which in the construction shown, forms a part of a pinion $d^3$ which is mounted on a stud $d^4$ rigidly secured in the frame of the machine. The pinion $d^3$ meshes with a gear $d^5$ mounted on a stud or upright shaft $d^6$ journalled in the lower part of the machine by means of a bearing $d^7$. The stud extends downwardly below the frame of the machine and is suitably secured to the central hub $c$ of the attachment holder C in any desired manner. In the construction shown, a key $e$ connects the hub of the attachment holder with the stud $d^6$ and a washer $e'$ arranged at the end of the stud $d^6$ is held in place thereon by means of a machine screw E or the like which engages the threaded hole in the lower end of the stud $d^6$.

The gearing described is arranged in a gear frame or housing including an annular or shell portion F which is secured by any suitable means, such as machine screws $f$ to an outwardly extending flange $f'$ arranged at the lower end of the motor housing A and preferably formed integral therewith. The upper end of the shell portion of the gear case F and the lower end of the outwardly extending flange $f'$ are preferably accurately positioned relatively to each other by means of a pair of annular shoulders $f^2$, similar to the shoulders of the motor housing and top bearing member hereinbefore described, which insure a proper centering of the gear case with reference to the motor. The gear frame or housing includes a gear receptacle or container $f^3$ formed integral therewith and which in outline closely follows the contour of the train of gears connecting the motor and the attaching plate. The gear receptacle or concavity of the gear frame or case is open at the top and is closed by the lower face of the bridge member $a^2$ of the motor frame, so that the gear receptacle in conjunction with the base of the motor housing and the flange $f'$ completely encloses the gears. This construction enables the gear housing to be packed with grease, in which the gears operate so that an efficient lubrication of the gears is insured. The contour of the housing $f^3$ for the gears is such as to leave air spaces $f^4$ at the opposite sides thereof through which the air is forced downwardly by means of the fan $b^6$.

The bearing $d^7$ arranged in the lower part of the gear housing may be of any usual or suitable kind, a ball bearing of the combined thrust and radial type being shown in the construction illustrated. The bearing shown has the usual inner and outer ball rings or bearing members and is secured in a central aperture in the lower face of the gear housing. The bearing is held in this aperture by means of a retaining plate G. This plate is annular in form and is secured to the gear housing in any suitable manner and the circular edge of the plate preferably engages the end of the inner ball ring of the bearing $d^7$, thus closing the annular groove or space between the inner and outer ball rings of the bearing. By means of this construction the retaining plate not only holds the bearing in place but also prevents the escape of grease through the space between the inner and outer ball rings. By means of this construction it is possible to lubricate the ball bearing $d^7$ from the grease within the gear casing. Other means for holding this bearing in place may be used if desired. The upper edge of the hub $c$ of the attachment holder bears against the inner ball ring of the bearing so that the attachment holder supports the weight of the motor through this bearing.

In order to afford room for the combined thrust and radial bearing $d^7$ the gear case is provided with an upwardly extending annular collar or flange $g$ and the gear $d^5$ is provided on its lower face with a recessed portion $g'$ into which the collar $g$ of the housing extends. By means of this construction, an exceedingly compact arrangement of the gears and bearings in the gear case is assured.

In order to facilitate the removal of the brush C' or other driven member, and to afford a secure connection between the driven member and the attachment holder C, regardless of the direction of the motor, the attachment holder is preferably provided with a plurality of double key-hole slots having enlarged openings K through which the heads of the studs or like $k$ secured to the driven member, may pass. At opposite sides of the enlarged opening K are slots $k'$ extending substantially circumferentially with reference to the center of the attachment holder into which the reduced portions of the studs $k$ may enter. When the motor shaft is revolving in one direction the studs will enter into one of the slots and when the motor shaft revolves in the opposite direction the studs will enter into the opposite slots. This arrangement affords a simple and reliable connection between the attachment holder and the driven member, and which makes it possible to drive the machine in either direction.

I claim as my invention:

1. In a machine of the kind described, the combination of a gear housing, a ball bearing having an outer ball ring secured in the lower portion of said housing and an inner ball ring, a stud extending through said bearing, an attachment holder having a central hub portion secured to said stud and engaging said inner ball ring; and a bearing retaining plate secured to said gear housing the inner edge of said plate engaging said inner ball ring to prevent the escape of lubricant through the space between said ball rings.

2. In a machine of the character described, the combination of a motor housing having a bottom bridging portion providing a seat for a shaft bearing and an outwardly extending flange formed integral with said bridging portion, a gear housing adapted to be secured to the bottom of said motor housing, a motor armature shaft extending from said motor housing through said bearing seat and said gear housing, said gear housing including an open gear receptacle, and a flange adapted for attachment to the outwardly extending flange of said motor housing, and gears in said gear receptacle and adapted to be driven by said armature, said gear housing having openings at the sides of said gear receptacle between said gear receptacle and the attaching flange of said gear housing, and in communication with the interior of the motor housing.

3. In a machine of the character described the combination of a motor housing having a bottom bridging member providing a centrally positioned seat for a shaft bearing and a top cover portion having outwardly and downwardly extending ventilating openings in the sides thereof, a gear housing adapted to be secured to the bottom of said motor housing, a shaft bearing in said seat, a drive shaft extending from said motor housing through said bearing into said gear housing, said gear housing including an open gear receptacle and an attaching portion for connection to said motor housing, gears in said gear receptacle and adapted to be driven by said drive shaft, said gear housing having openings at the sides of said gear receptacle between said gear receptacle and the attaching portion of said gear housing, whereby air may be drawn down through said motor housing and through said openings.

Witness my hand this 15th day of October, 1920.

GEORGE L. KELLEY.